US012786001B2

(12) United States Patent
Kurahashi

(10) Patent No.: US 12,786,001 B2
(45) Date of Patent: Nov. 3, 2026

(54) CONTROL APPARATUS, COMMUNICATION CYCLE ADJUSTMENT METHOD, AND RECORDING MEDIUM

(71) Applicant: Mitsubishi Electric Corporation, Tokyo (JP)

(72) Inventor: Hiroaki Kurahashi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 306 days.

(21) Appl. No.: 18/723,474

(22) PCT Filed: Jan. 5, 2022

(86) PCT No.: PCT/JP2022/000087
§ 371 (c)(1),
(2) Date: Jun. 24, 2024

(87) PCT Pub. No.: WO2023/132008
PCT Pub. Date: Jul. 13, 2023

(65) Prior Publication Data
US 2025/0055723 A1 Feb. 13, 2025

(51) Int. Cl.
*H04L 12/40* (2006.01)
*H04W 56/00* (2009.01)

(52) U.S. Cl.
CPC ........... *H04L 12/40* (2013.01); *H04W 56/001* (2013.01)

(58) Field of Classification Search
CPC ....... H04L 12/40; H04L 12/28; H04W 56/001
(Continued)

(56) References Cited

U.S. PATENT DOCUMENTS

2009/0304021 A1* 12/2009 Kraemer ............... H04L 12/417 370/468
2019/0069238 A1* 2/2019 Choi ................. H04W 72/0446
(Continued)

FOREIGN PATENT DOCUMENTS

CN 104243110 A 12/2014
CN 108696298 A 10/2018
(Continued)

OTHER PUBLICATIONS

Office Action dated Jan. 11, 2025, issued for the corresponding CN patent application No. 202280086452.9 and the English translation, 15pp.
(Continued)

*Primary Examiner* — Obaidul Huq
(74) *Attorney, Agent, or Firm* — XSENSUS LLP

(57) ABSTRACT

The control apparatus includes a communicator that performs, in a communication cycle, in each of a plurality of time segments included in the communication cycle, a type of communication that corresponds to the time segment, a measurer that measures a control time taken for controlling the control target device when a first type of communication is performed independently of the plurality of time segments, and a time slot setter that, when a size of communication data transmitted or received to control the control target device in the first type of communication is smaller than a transmission capacity of data in a time segment that is included in the plurality of time segments included in the communication cycle included in the control time and that corresponds to the first type, shortens a length of the time segment corresponding to the first type from a current setting value.

12 Claims, 16 Drawing Sheets

(58) Field of Classification Search
USPC .......................................................... 370/328
See application file for complete search history.

(56) References Cited

U.S. PATENT DOCUMENTS

| | | | | |
|---|---|---|---|---|
| 2019/0387487 | A1* | 12/2019 | Nagao | H04W 72/0446 |
| 2023/0067697 | A1 | 3/2023 | Komori | |
| 2023/0069599 | A1 | 3/2023 | Hayashi | |

FOREIGN PATENT DOCUMENTS

| | | | |
|---|---|---|---|
| CN | 113612700 | A | 11/2021 |
| JP | 2006-318367 | A | 11/2006 |
| JP | 6987323 | B1 | 12/2021 |
| KR | 101992815 | B1 | 6/2019 |
| WO | 2021/176697 | A1 | 9/2021 |
| WO | 2021/199191 | A1 | 10/2021 |

OTHER PUBLICATIONS

International Search Report and Written Opinion mailed on Feb. 15, 2022, received for PCT Application PCT/JP2022/000087, filed on Jan. 5, 2022, 8 pages including English Translation.
Decision to Grant mailed on May 10, 2022, received for JP Application 2022-522659, 5 pages including English Translation.

* cited by examiner

FIG.5

121

| DEVICE INFORMATION TABLE | | | | | | | | |
|---|---|---|---|---|---|---|---|---|
| DEVICE COMPONENT | CAM21 | | SNSR22 | | PLC23[ NW-U231, CPU-U232, IO-U233 [DEV239]] | | | ··· |
| COMMUNICATION TYPE | P2 | P0 | P2 | P0 | P1 | P2 | P0 | ··· |
| COMMUNICATION ATTRIBUTE | CTRL | INFO | CTRL | INFO | CTRL | | INFO | ··· |
| COMMUNICATION CYCLE TOLERANCE | 100 ms OR LESS | — | 100 ms OR LESS | — | 1 ms OR LESS | 100 ms OR LESS | — | ··· |
| TRANSPORT LAYER PROTOCOL | — | TCP | — | UDP | — | | TCP | ··· |
| PROCESSING TIME | 100 μs | | 10 μs | | 200 μs | | | ··· |
| ALLOCATED TIME SLOT | TS2 | TS0 | TS2 | TS0 | TS1 | TS2 | TS0 | ··· |
| INPUT DATA SIZE | — | (100)** | — | | — | | | ··· |
| INPUT DATA ACQUIRING TIME | — | 5 μs | — | | — | | | ··· |

CONTROL APPARATUS, COMMUNICATION CYCLE ADJUSTMENT METHOD, AND RECORDING MEDIUM

CROSS-REFERENCE TO RELATED APPLICATION

This application is a national stage application, pursuant to 35 U.S.C. § 371, of International Patent Application No. PCT/JP2022/000087, filed Jan. 5, 2022, the entire contents of which are incorporated herein by reference.

TECHNICAL FIELD

The present disclosure relates to a control apparatus, a communication cycle adjustment method, and a program.

BACKGROUND ART

At factory automation (FA) sites, multiple devices communicate with one another through an industrial network as a system to control many devices. Communication for such control is to be performed in real time to control the devices in a coordinated manner. Communication schemes for integrating such an industrial network with a general-purpose information network that may not focus on real-time performance have been standardized and have received attention. An example of such communication schemes is IEEE 802.1 Time-Sensitive Networking (TSN). IEEE 802.1 TSN is hereafter referred to as the TSN standards.

A network under the TSN standards includes, in each communication cycle, time slots each corresponding to a communication type. The lengths of the time slots may be determined using a technique for determining time lengths for different types of communication (see, for example, Patent Literature 1).

Patent Literature 1 describes a bus management system in which multiple controller units are connected with a bus. In this bus management system, a bus manager calculates, based on information collected from the controller units, a cyclic communication time taken for transferring cyclic data and a transient communication time taken for transferring transient data. The controller units communicate based on the calculation results.

CITATION LIST

Patent Literature

Patent Literature 1: Unexamined Japanese Patent Application Publication No. 2006-318367

SUMMARY OF INVENTION

Technical Problem

In the network under the TSN standards, the communication cycles are to be shortened to improve real-time performance. However, the technique described in Patent Literature 1 calculates the communication time based on communication cycles having the fixed length, and thus is not directed to adjustment of the communication cycles and does not improve the real-time performance. The real-time performance is to be improved in communication on the network including time slots corresponding to communication types.

Under the above circumstances, an objective of the present disclosure is to improve real-time performance in communication on a network including time slots corresponding to communication types.

Solution to Problem

To achieve the above objective, a control apparatus according to the present disclosure is a control apparatus that controls a control target device through a network and includes communication means for performing, in a communication cycle defined by a shared time shared with the control target device, in each of a plurality of time segments included in the communication cycle, a type of communication that corresponds to the time segment, measurement means for measuring a control time taken for controlling the control target device when a first type of communication is performed independently of the plurality of time segments, and adjustment means for adjusting, when a size of communication data transmitted or received to control the control target device in the first type of communication is smaller than a transmission capacity of data in a time segment that is included in the plurality of time segments included in the communication cycle included in the control time and that corresponds to the first type, a length of the communication cycle by shortening a length of the time segment corresponding to the first type from a current setting value.

Advantageous Effects of Invention

In the structure according to the present disclosure, when the communication data size is smaller than the data transmission capacity in the time segment corresponding to the first type, the adjustment means adjusts the length of the communication cycle by shortening the length of the time segment corresponding to the first type. This shortens the communication cycle as well as the time slot as the time segment, thus improving real-time performance in communication on a network including time slots corresponding to communication types.

BRIEF DESCRIPTION OF DRAWINGS

FIG. 5 is an example device information table in the embodiment;

DESCRIPTION OF EMBODIMENTS

A control apparatus 10 according to an embodiment of the present disclosure is described in detail below with reference to the drawings.

EMBODIMENT

Figure 1:
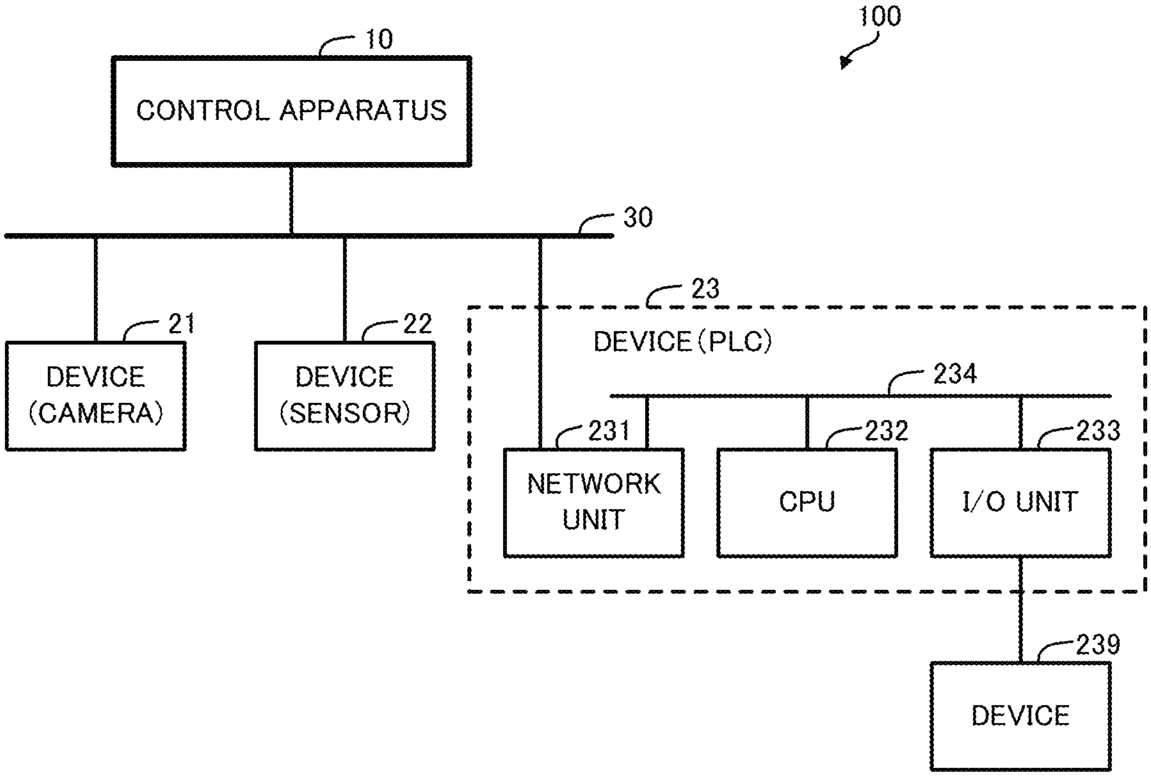
FIG. 1 is a block diagram of a control system according to an embodiment.

As illustrated in FIG. 1, a control apparatus 10 according to an embodiment is included in a control system 100 including devices 21, 22, 23, and 239. The control system 100 corresponds to a part of a factory automation (FA) system installed at a factory. The FA system may be, for example, a production system, an inspection system, a machining system, or another system. In the control system 100, the control apparatus 10 adjusts cycles of communication performed between the devices 21 to 23 using time-division multiplexing.

The control apparatus 10 and the devices 21 to 23 are connected to and communicate with one another through a network 30. The network 30 is an industrial network under a fieldbus standard.

The control apparatus 10 is a programmable logic controller (PLC) or an industrial personal computer (IPC) functioning as a master station on the network 30. The devices 21 to 23 function as slave stations managed by the master station. The device 21 is a camera that photographs a production line, and the device 22 is a sensor installed on the production line. The device 23 is a PLC including a network unit 231, a central processing unit (CPU) 232, and an input-output (I/O) unit 233 that are connected to one another with a system bus 234. The I/O unit 233 in the device 23 is connected to the device 239 with a signal line.

The control apparatus 10 controls the devices 21 to 23 and 239 to operate the control system 100. For example, the control apparatus 10 causes, based on an image output from the device 21, the device 239 being a robot connected to the device 23 to move the arm to transport a workpiece.

Figure 2:
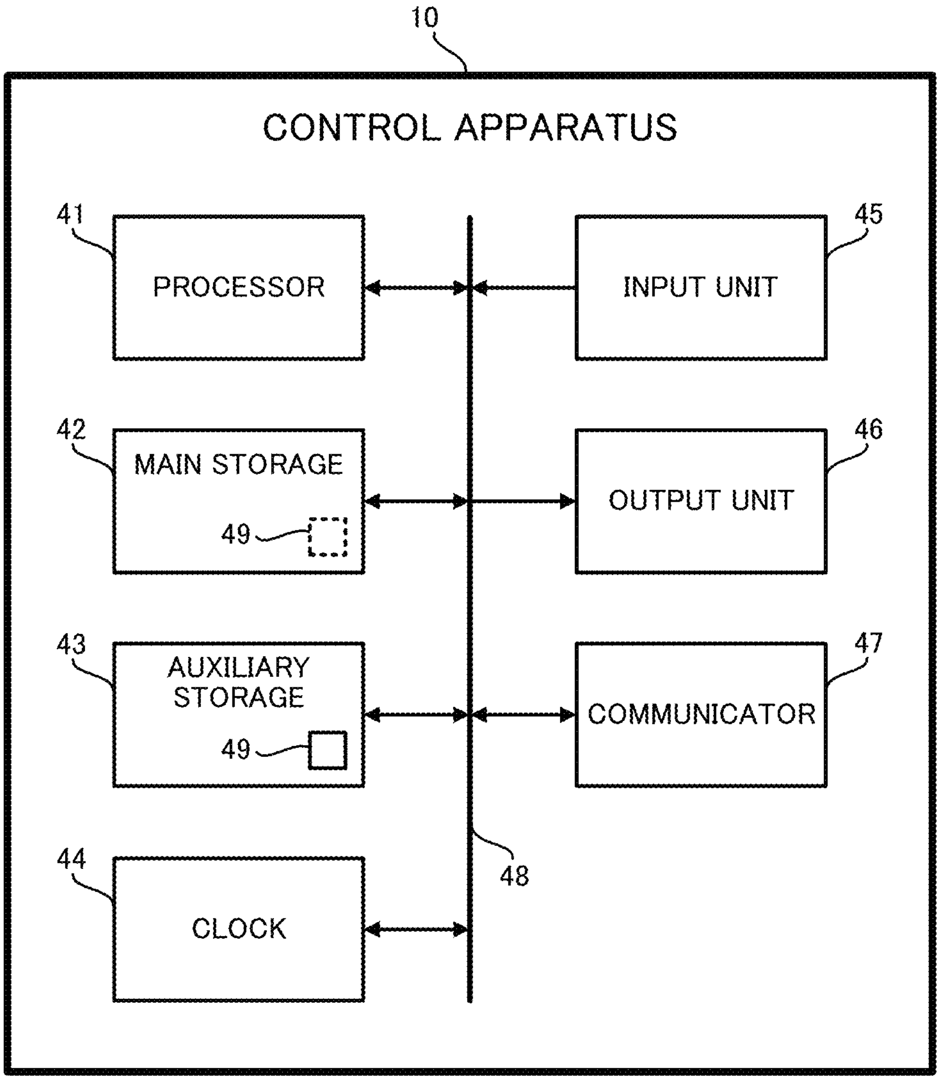
FIG. 2 is a block diagram of a control apparatus according to the embodiment, illustrating the hardware configuration.

FIG. 2 is a diagram of the control apparatus 10, illustrating the hardware configuration. The control apparatus 10 includes, as the hardware components, a processor 41, a main storage 42, an auxiliary storage 43, a clock 44, an input unit 45, an output unit 46, and a communicator 47. The main storage 42, the auxiliary storage 43, the clock 44, the input unit 45, the output unit 46, and the communicator 47 are connected to the processor 41 with an internal bus 48.

The processor 41 includes a CPU or a micro processing unit (MPU) that is an integrated circuit. The processor 41 executes a program 49 stored in the auxiliary storage 43 to implement various functions of the control apparatus 10 and perform processes described later.

The main storage 42 includes a random-access memory (RAM). The main storage 42 stores the program 49 loaded from the auxiliary storage 43. The main storage 42 is used as a work area for the processor 41.

The auxiliary storage 43 includes a nonvolatile memory such as an electrically erasable programmable read-only memory (EEPROM) and a hard disk drive (HDD). The auxiliary storage 43 stores, in addition to the program 49, various sets of data used for processing performed by the processor 41. The auxiliary storage 43 provides data usable by the processor 41 to the processor 41 as instructed by the processor 41, and stores data provided from the processor 41.

The clock 44 includes, for example, a clock generator including a quartz resonator, a silicon resonator, a quartz oscillator, or another oscillator circuit. The clock 44 generates a clock signal based on a clock generated by the clock generator, and outputs the clock signal. The clock signal includes a clock pulse and is used by the processor 41 to measure time by counting the number of times the clock pulse rises using a built-in hardware device or through software processing.

The input unit 45 includes input devices such as input keys and a pointing device. The input unit 45 acquires information input by a user of the control apparatus 10 and provides the acquired information to the processor 41.

The output unit 46 includes output devices such as a light-emitting diode (LED), a liquid crystal display (LCD), and a speaker. The output unit 46 presents various items of information to the user as instructed by the processor 41.

The communicator 47 includes a network interface circuit for transmitting or receiving an Ethernet frame to and from an external device. The communicator 47 receives a signal from the external device and outputs data indicated by the signal to the processor 41. The communicator 47 also transmits a signal indicating data output from the processor 41 to the external device.

Referring back to FIG. 1, the control apparatus 10 and the devices 21 to 23 communicate under the TSN standards. An overview of the communication under the TSN standards is described below. The devices 21 to 23 are collectively referred to as a device 20.

The control apparatus 10 and the devices 20 are synchronized through the network 30. More specifically, each of the control apparatus 10 and the devices 20 shares the time with the other devices under a synchronous protocol. The synchronous protocol is used to synchronize devices on a communication network with high accuracy. For example, when IEEE 802.1 AS is used as the synchronous protocol, a grandmaster corresponding to one node on the network periodically distributes an accurate reference clock through the communication network. Data is transmitted between the grandmaster and a slave node to measure a communication delay. The slave node acquires a reference clock with the communication delay being corrected. This allows sharing of the time with the communication delay being corrected.

The time sharing and the synchronization among multiple devices refer to synchronization of clocks included in the respective devices. When the clocks in the respective devices indicate the equivalent time, the devices share the time with one another and are synchronized. The time shared between the devices is hereafter referred to as the shared time.

Figure 3:
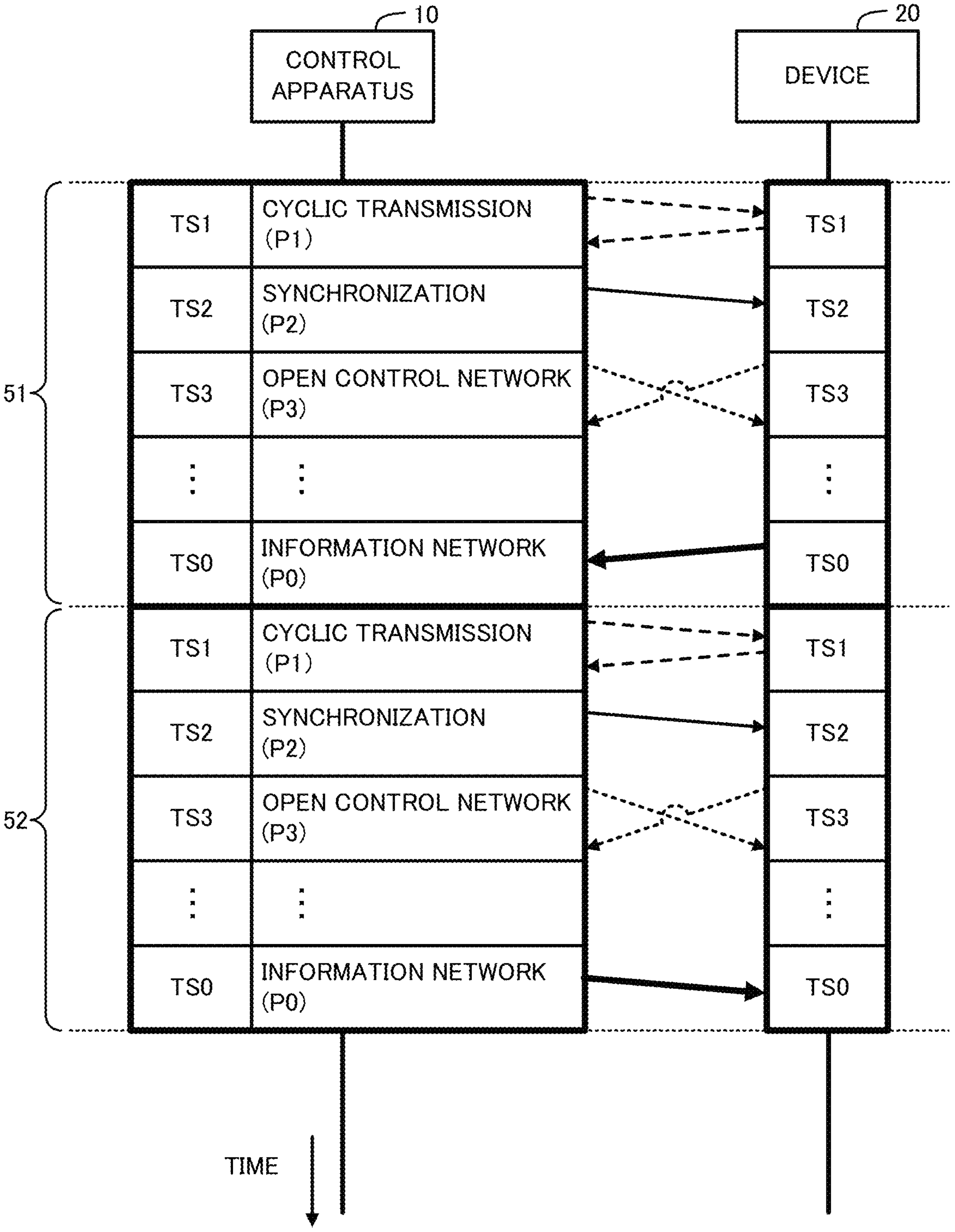
FIG. 3 is a schematic diagram describing communication using time-division in the embodiment.

The control apparatus 10 and the devices 20 transmit or receive data based on a schedule predetermined with the shared time under a protocol defined in IEEE 802.1 Qbv. More specifically, as illustrated in FIG. 3, the control apparatus 10 and the devices 20 communicate using time-division multiplexing in each of communication cycles 51 and 52 each having a length predetermined with the shared time.

The communication cycles 51 and 52 are consecutive to each other. More specifically, the communication cycle 52 immediately follows the communication cycle 51, with the end time of the communication cycle 51 coinciding with the start time of the communication cycle 52. Although FIG. 3 illustrates two communication cycles 51 and 52, cycles equivalent to the communication cycles 51 and 52 periodically precede the communication cycle 51 and periodically follow the communication cycle 52.

The communication cycles 51 and 52 each include time slots TS1, TS2, TS3, . . . , and TS0 that are consecutive to one another. When the time slots TS1, TS2, TS3, . . . , and TS0 occur in this order in the communication cycle 51 as illustrated in FIG. 3, the start time of the time slot TS1 coincides with the start time of the communication cycle 51. The end time of each time slot coincides with the start time of the subsequent time slot. The end time of the time slot TS0 coincides with the end time of the communication cycle 51. The time slot TS1 in the communication cycle 52 immediately follows the time slot TS0 in the communication cycle 51.

The time slots are time segments for different types of communication under predetermined protocols, channels, or formats. For example, the time slot TS1 is a time segment for cyclic transmission. The cyclic transmission is a communication scheme to synchronize, in each of consecutive cycles, data to be stored into the memories in devices by performing, in cycles, communication for storing the common data into the memories. The time slot TS2 is a time segment for communication under a synchronous protocol. The time slot TS3 is a time segment for communication under an open control network protocol published for control networks.

The time slots including the time slots TS1, TS2, TS3, and subsequent time slots other than the time slot TS0 are each a time segment used for communication under a control network protocol that involves punctuality. The control network protocol is a protocol that guarantees transmission of information within a predetermined time length due to transmission of data in each cycle and thus guarantees real-time information sharing between devices. The control network protocol corresponds to an example of a second type included in types of communication performed by the control apparatus 10.

The time slot TS0 is a time segment for communication under an information network protocol that may not involve punctuality. Unlike the control network protocol, under the information network protocol, information transmission may not be guaranteed within a predetermined time length. In the time slot TS0, for example, data is transmitted in a best-effort manner. The transmission thus takes a longer time when many devices transmit data in the time slot TS0, and the data may be lost when the transmission time exceeds the length of the time slot TS0. In the time slot TS0, additionally, data may not be transmitted in each cycle and may be transmitted as appropriate in any cycle. In the time slot TS0, for example, an Internet Protocol (IP) communication is performed. The information network protocol corresponds to an example of a first type included in types of communication performed by the control apparatus 10.

The time slot TS0 typically has a length set as, for example, a difference calculated by subtracting the length of the time slots TS1, TS2, TS3, and subsequent time slots corresponding to the control network protocol from a communication cycle determined based on specifications of each device on the network 30. However, the time slot TS0 set in this manner may be extra long for actual communication volume, and the communication cycle can be shortened. In contrast, the control apparatus 10 according to the present embodiment adjusts the communication cycle by shortening the time slot TS0 based on the actual communication volume.

Figure 4:
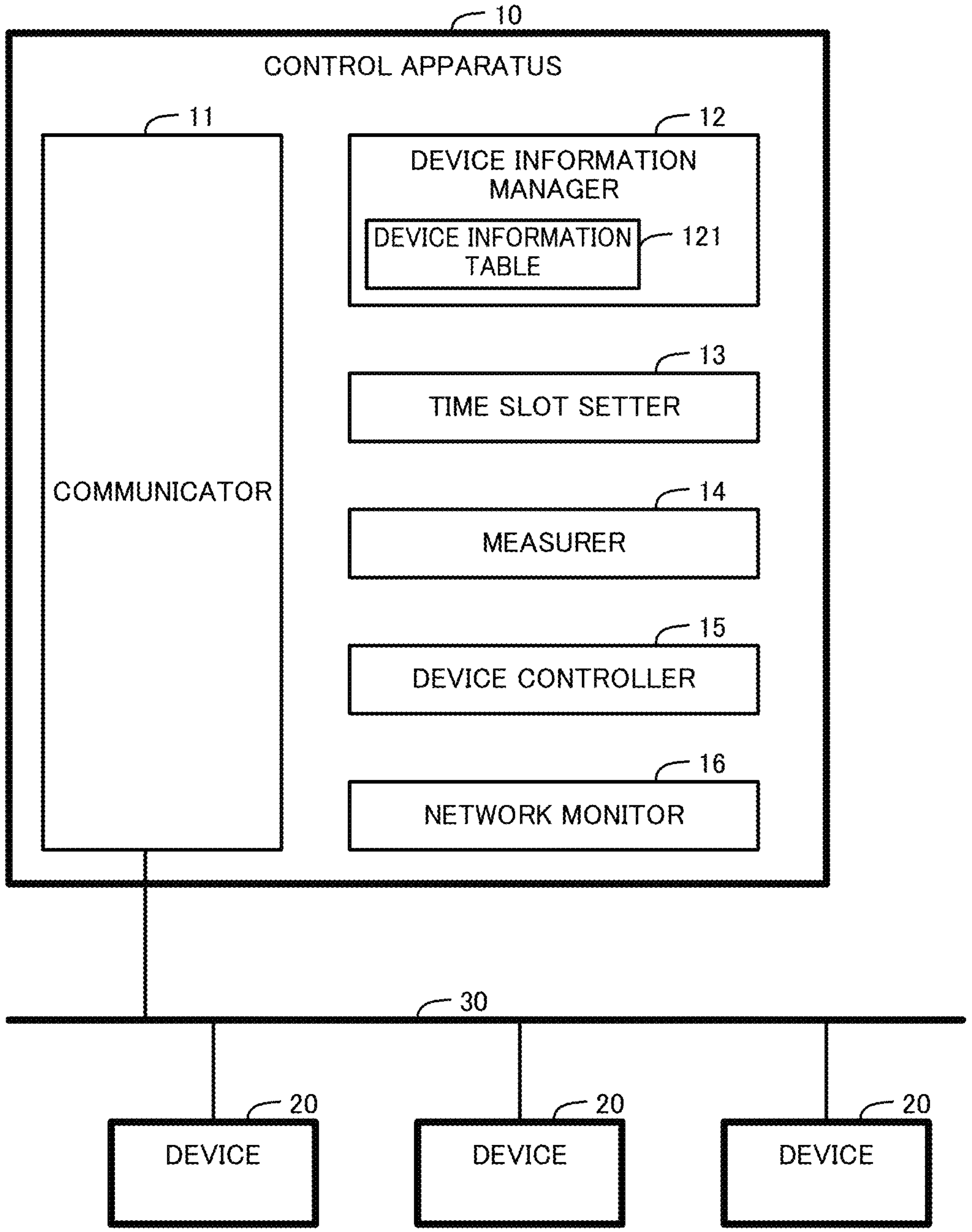
FIG. 4 is a functional block diagram of the control apparatus according to the embodiment.

FIG. 4 illustrates the functional components of the control apparatus 10. As illustrated in FIG. 4, the control apparatus 10 includes, as the functional components, a communicator 11 that communicates through the network 30, a device information manager 12 that acquires information from the devices 20 and manages the information, a time slot setter 13 that sets the time slot length, a measurer 14 that measures the size and the transmission time of data, a device controller 15 that controls the devices 20, and a network monitor 16 that monitors the state of the network 30.

The communicator 11 is mainly implemented by the processor 41, the clock 44, and the communicator 47 operating in cooperation. The communicator 11 communicates with the devices 20 through the network 30 under the TSN standards. More specifically, the communicator 11 as a grandmaster distributes, to the devices 20, the shared time using the time of the clock 44 as a reference, and shares the shared time with the devices 20. The communicator 11 may be a slave node that acquires the shared time distributed by another grandmaster. As illustrated in FIG. 3, the communicator 11 performs, in each communication cycle, the types of communication corresponding to the time slots. In the control apparatus 10, the communicator 11 corresponds to an example of communication means for performing, in a communication cycle defined by a shared time shared with the devices 20 as control target devices, in each of a plurality of time segments included in the communication cycle, a type of communication that corresponds to the time segment. The communicator 11 also performs communication instructed by the device information manager 12, the time slot setter 13, and the measurer 14 as a preparation for setting the time slot length and the communication cycle.

The device information manager 12 is mainly implemented by the processor 41 and at least one of the main storage 42 or the auxiliary storage 43 operating in cooperation. The device information manager 12 collects, through the communicator 11, information for communicating with the devices 20 under the TSN standards, and writes the collected information into a device information table 121. The device information manager 12 also acquires, from the time slot setter 13, information indicating time slots set by the time slot setter 13, acquires, from the measurer 14, information indicating the results of measurement performed by the measurer 14, and writes the acquired information into the device information table 121. The device information manager 12 provides information in the device information table 121 to an external device.

As illustrated in FIG. 5, the device information table 121 is a data table including, for each device 20 in an associated manner, the device component indicating the components of the device 20, the communication type indicating types of communication performed by the device 20, the communication attribute indicating whether each communication type is the control network protocol or the information network protocol, the communication cycle tolerance indicating a value tolerable as a time slot cycle for the control network protocol, the transport layer protocol indicating a specified protocol at the upper layer of IP communication for the information network protocol, the processing time indicating a time taken from the start to the end of an arithmetic operation on data by the device 20, the time slot allocated for communication performed by the device 20, the input data size indicating the size of input data acquired by the control apparatus 10 from the device 20, and a time taken for acquiring the input data.

For example, the device component in the device information table 121 may indicate a model, a model number, or an address of each device 20. The device component of the device 23 being a PLC indicates the components of the PLC including all the units connected with the same bus and the device 239 connected to the I/O unit 233. In FIG. 5, PLC23 indicating the device 23 being a PLC includes NW-U231 indicating the network unit 231, CPU-U232 indicating the CPU 232, and IO-U233 indicating the I/O unit 233, and the device 239 indicated by DEV239 is connected to the I/O unit 233.

Under the communication type in FIG. 5, P0 corresponds to the information network protocol as illustrated in FIG. 3, P1 corresponds to cyclic transmission, and P2 corresponds to a synchronous protocol. Under the communication attribute, CTRL indicates the control network protocol, and INFO indicates the information network protocol.

The communication cycle tolerance indicates a different range for each control network protocol. The transport layer protocol indicates a transmission control protocol (TCP) or a user datagram protocol (UDP). The processing time is measured by each device 20 at the time of activation. For example, the processing time of the device 21 being a camera is a time taken from capturing an image to the end of execution of operation for conversion for outputting the image to an external device. The processing time of the device 23 being a PLC is a time taken for optimizing each unit connected with the bus and the device 239. The processing time is, for example, a time for the device 239 being a robot to end moving the arm after the network unit 231 receives an instruction for the device 239.

Information about the device component, the communication type, the communication attribute, the communication cycle tolerance, the transport layer protocol, and the processing time is collected from each device 20 and registered with the device information table 121 by the device information manager 12. In the control apparatus 10, the device information manager 12 corresponds to an example of acquisition means for acquiring, from the control target device, type information indicating types of communication to be performed. The type information corresponds to information including the communication type. Registration of the allocated time slot, the input data size, and the input data acquiring time with the device information table 121 is described later.

The time slot setter 13 is mainly implemented by the processor 41. The time slot setter 13 allocates, to the time slots, the types of communication performed by each device 20 based on the communication type and the communication attribute in the information collected from the device 20. In the control apparatus 10, the time slot setter 13 corresponds to an example of allocation means for allocating a type of the types of communication indicated by the type information to the plurality of time segments included in the communication cycle. The time slot setter 13 registers the allocated time slot with the device information table 121 as illustrated in FIG. 5.

The time slot setter 13 sets an initial value of the length of the time slot TS0 based on the length of the time slot corresponding to the control network protocol predetermined by the user and on the initial value of the communication cycle. The initial value of the communication cycle may be determined by the device information manager 12 or the time slot setter 13 based on the communication cycle tolerance in the device information table 121.

When determining, based on the initial value of the length of the time slot TS0 and a measurement result of the measurer 14, that the initial value is extra long, the time slot setter 13 shortens the length of the time slot TS0 to adjust the communication cycle. The determination by the time slot setter 13 is described in detail later.

The measurer 14 is mainly implemented by the processor 41 and the clock 44 operating in cooperation. The measurer 14 measures the control time taken for the control apparatus 10 to control the devices 20 with the type of communication corresponding to the time slot TS0, and the size of communication data transmitted in the time slot TS0 to control the devices 20.

Figure 6:
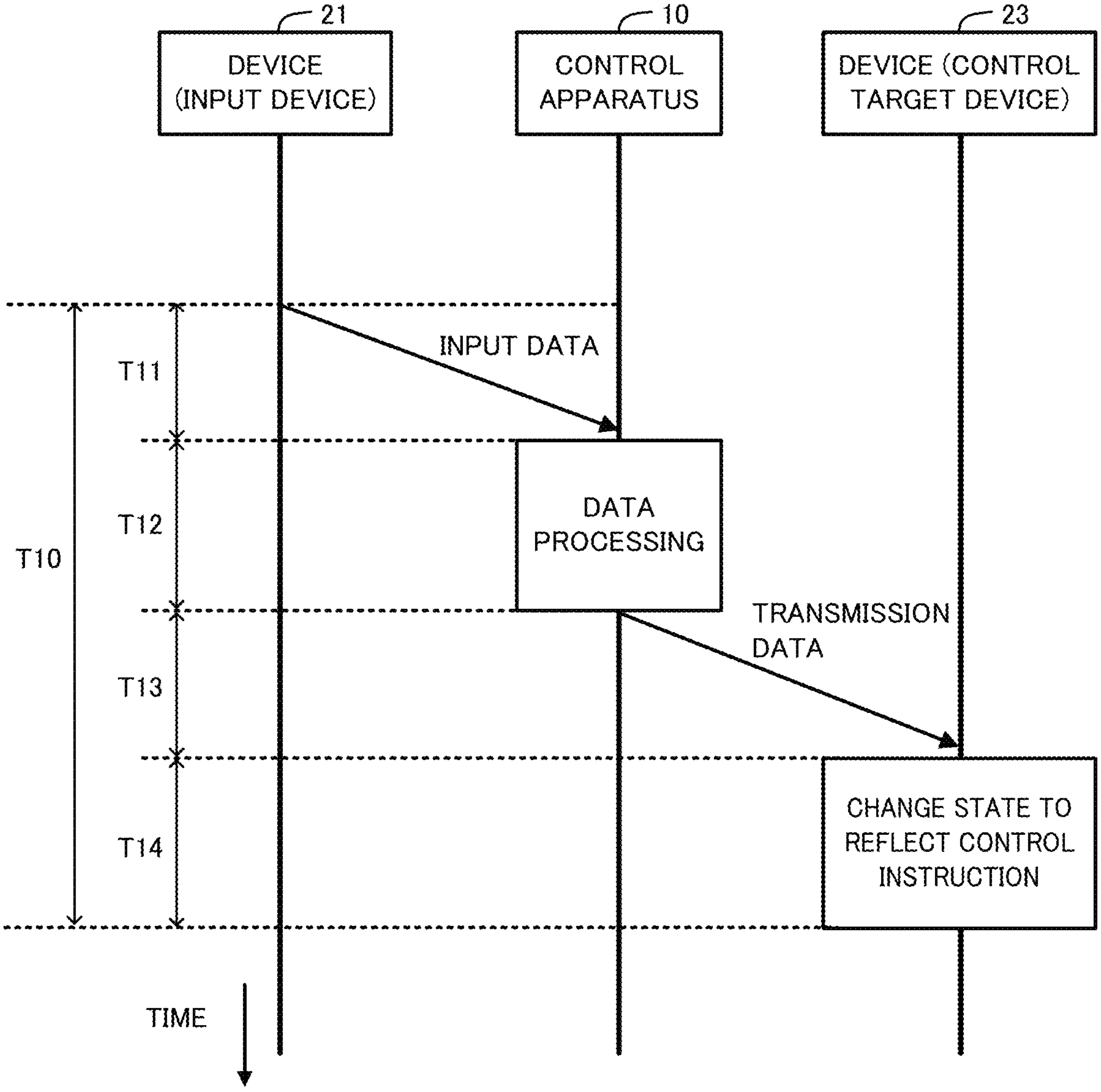
FIG. 6 is a diagram describing a control time in the embodiment.

As illustrated in FIG. 6, the control apparatus 10 controls the device 23 as a control target device to change the state by processing data based on input data from the device 21 as an input device and transmitting, to the device 23, transmission data including a control instruction as a processing result. Each piece of data is transmitted under the information network protocol. A control time T10 taken for such a control is equal to the sum of a time T11 taken for acquiring the input data, a time T12 taken for the control apparatus 10 to process the data, a time T13 taken for transmitting the control instruction, and a time T14 taken for the device 23 to change the state to reflect the control instruction. The control time T10 is the time in which the control target device is controlled with communication under the information network protocol without setting the time slots, and is the time taken for controlling the control target device with communication under the information network protocol independently of the time slots as time segments. More specifically, when a device 20 is controlled with communication under the TSN standards, the entire control time T10 illustrated in FIG. 6 may not be in a single time slot TS0. A time T11 may be included in the time slot TS0, and a time T13 may be included in the subsequent time slot TS0. The measurer 14 thus measures and acquires the sum of the times T11 to T14 to measure the control time T10. The control time T10 corresponds to the time taken for controlling the devices 20 without setting time during which data transmission is prohibited, with communication under the information network protocol constantly permitted.

Figure 7:
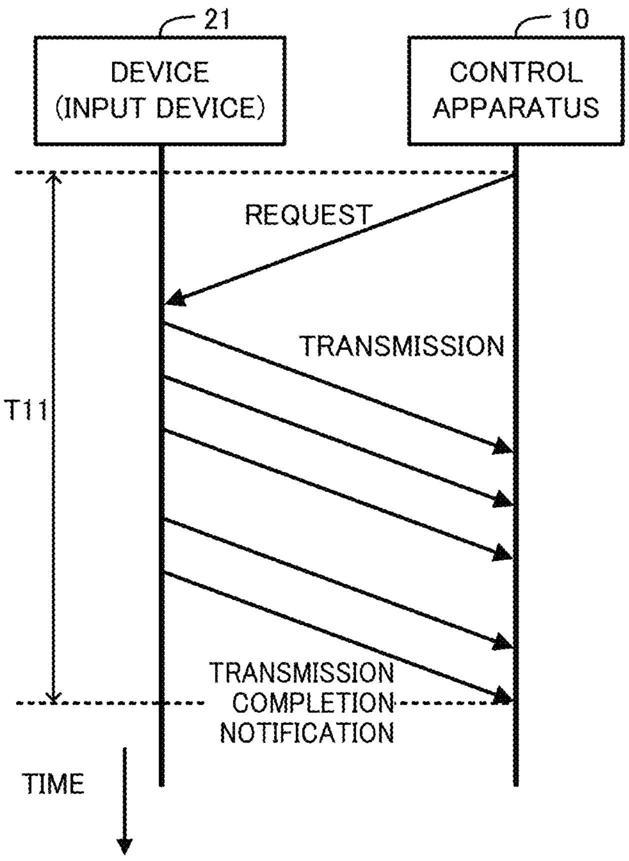
FIG. 7 is a first diagram illustrating an example input data acquiring time in the embodiment.

The measurer 14 measures the times T11 and T13 based on information provided from the devices 21 and 23. As illustrated in FIG. 7, for example, the measurer 14 requests sample data equivalent to data generated during the normal operation of the device 21 and output to an external device. Upon receiving the request, the device 21 starts transmitting the sample data. Once transmission of all pieces of the sample data is complete, the device 21 notifies the control apparatus 10 of the completion of the transmission. The measurer 14 in the control apparatus 10 may measure the time T11 from the request to the reception of the transmission completion notification. As illustrated in FIG. 5, the time T11 measured by the measurer 14 is registered with the device information table 121 as the input data acquiring time.

Figure 8:
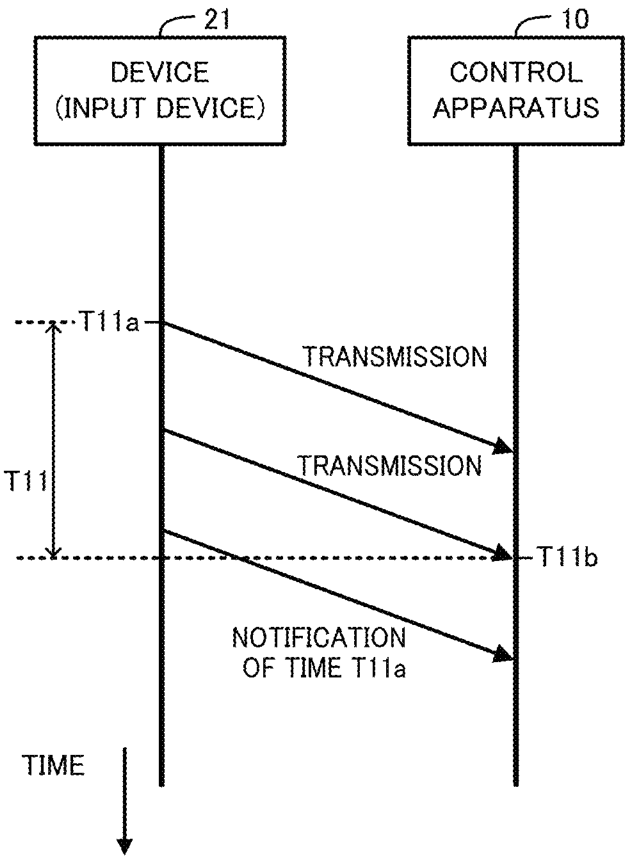
FIG. 8 is a second diagram illustrating an example input data acquiring time in the embodiment.

The method for measuring the time T11 is not limited to the example in FIG. 7. As illustrated in FIG. 8, the measurer 14 may acquire the time T11 by receiving, from the device 21, the notification of a time T11*a* at which the device 21 starts transmitting input data, and subtracting the notified time T11*a* from a time T11*b* at which the last input data is received.

Figure 9:
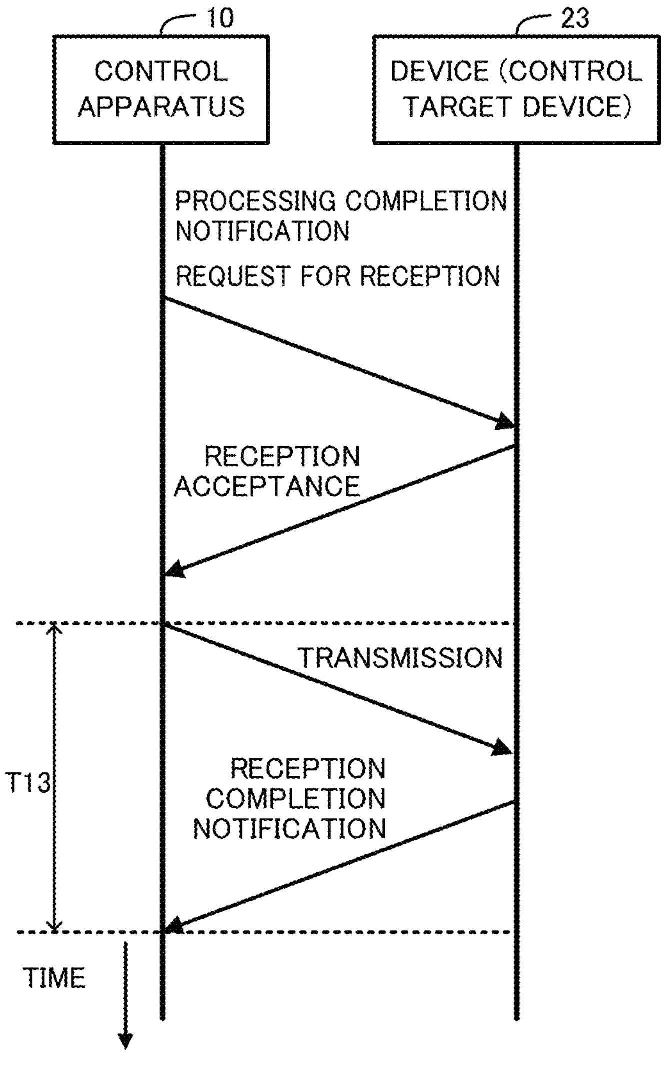
FIG. 9 is a diagram illustrating an example transmission data transmission time in the embodiment.
Figure 10:
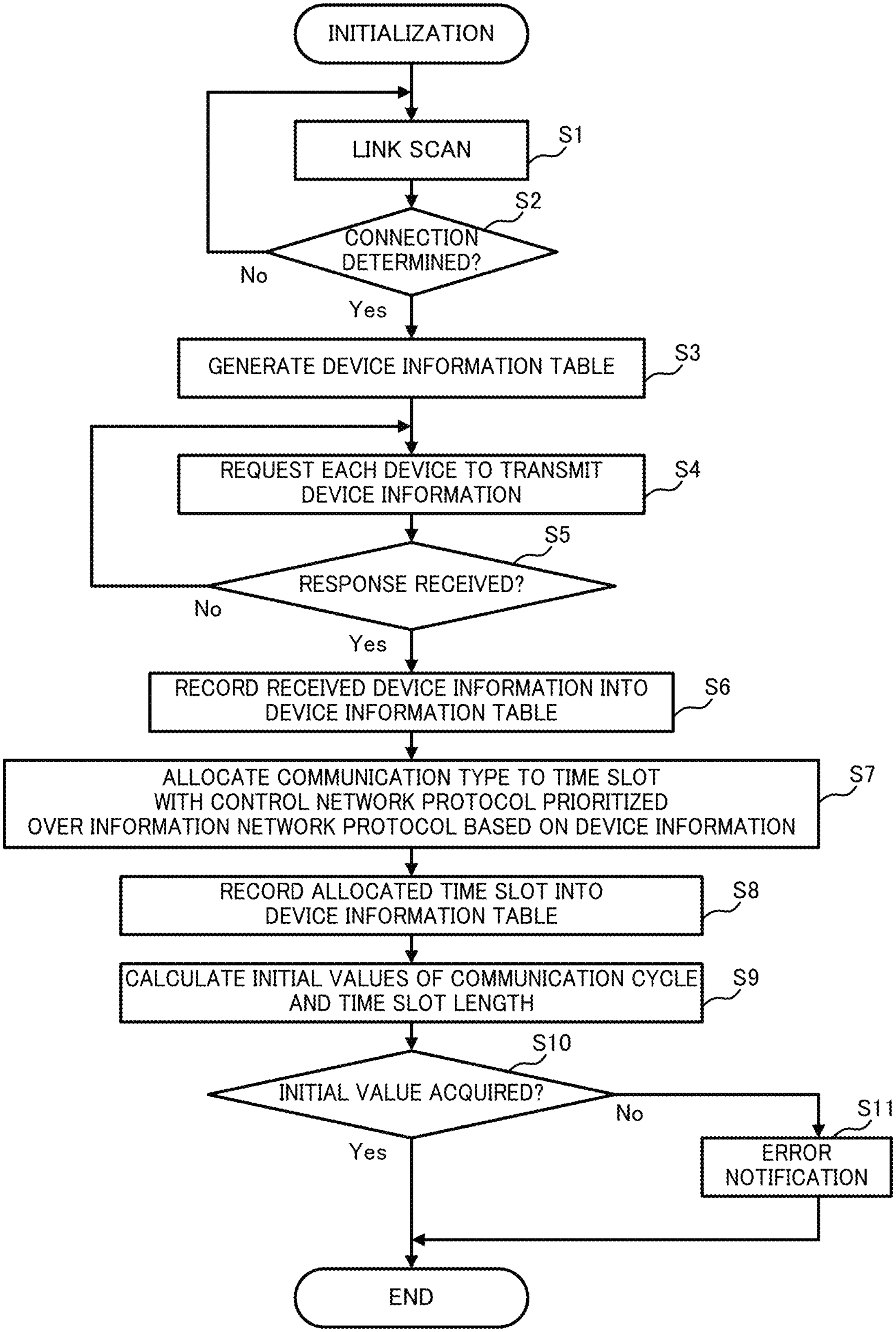
FIG. 10 is a flowchart of initialization in the embodiment.

As illustrated in FIG. 9, the measurer 14 notifies, after the control apparatus 10 ends data processing, the device 23 of the completion of the processing and requests the device 23 to receive the processing result. Upon receiving the request, the device 23 notifies the control apparatus 10 of reception acceptance, and the control apparatus 10 starts transmitting transmission data. Once the transmission data is received, the device 23 notifies the control apparatus 10 of the completion of the reception. The measurer 14 may measure a time T13 from the start of transmission of the transmission data to the reception of the reception completion notification. The method for measuring the time T13 is not limited to the example in FIG. 9, and may be changed as appropriate.

The measurer 14 may acquire a measurement value of a time T14 by referring to the processing time in the device information table 121 illustrated in FIG. 5. The device 23 may actually process the transmission data received as a sample, measure the time taken for the processing, and provide the measurement result to the measurer 14.

The measurer 14 further measures the input data size. As illustrated in FIG. 5, the measurer 14 records the measurement result as the input data size into the device information table 121. The measurer 14 also measures the sum of the input data size and the transmission data size as a communication data size. The control time length and the communication data size measured by the measurer 14 are used for adjusting the communication cycle as described later. In the control apparatus 10, the measurer 14 corresponds to an example of measurement means for measuring a control time taken for controlling the control target device when communication is performed independently of time segments.

Referring back to FIG. 4, the device controller 15 is mainly implemented by the processor 41. The device controller 15 communicates with the devices 20 through the communicator 11 based on the communication cycle adjusted by the time slot setter 13 and processes data to control the device 20 to be controlled. More specifically, the device controller 15 processes data to generate transmission data based on the input data in the example in FIG. 5. In the control apparatus 10, the device controller 15 corresponds to an example of data processing means for processing data to control the control target device.

The network monitor 16 is mainly implemented by the processor 41. The network monitor 16 monitors the state of the network 30 to learn the relationship between the operating state of the network 30 and a parameter for determining the length of the time slot TS0. With the network monitor 16 learning further, the length of the time slot TS0 is determined based on the state of the network 30 without measurement by the measurer 14. In the control apparatus 10, the network monitor 16 corresponds to an example of learning means for learning the state of communication on the network in the communication cycle adjusted by the time slot setter 13 as the adjustment means.

Initialization and communication cycle adjustment performed by the control apparatus 10 are now described with reference to FIGS. 10 to 16. The initialization in FIG. 10 starts when the control apparatus 10 is activated.

In the initialization, the control apparatus 10 performs link scan (step S1). More specifically, the device information manager 12 determines whether the devices 20 are connected to the control apparatus 10 through the network 30 (step S2).

When failing to determine the connection of the devices 20 in link scan (No in step S2), the control apparatus 10 repeats the processing in step S1. When determining the connection of at least one device 20 in link scan (Yes in step S2), the device information manager 12 generates the device information table 121 (step S3) and lists individual information about the device 20 determined to be connected in the device information table 121. More specifically, information under the device component in FIG. 5 is recorded for each device 20.

The device information manager 12 then requests each device 20 determined to be connected to transmit device information (step S4). When receiving no response to the request (No in step S5), the device information manager 12 repeats the processing in step S4. When receiving a response to the request (Yes in step S5), the device information manager 12 records the device information into the device information table 121 (step S6). The communication type, the communication attribute, the communication cycle tolerance, the transport layer protocol, and the processing time in FIG. 5 for each device 20 are thus recorded. Each device 20 collects, after activation, information about the device 20 and measures the processing time. The device 20 returns the device information including the collection results and the measurement result in response to the request from the control apparatus 10.

Subsequently, the time slot setter 13 allocates, based on the device information, a communication type to the time slot with the control network protocol prioritized over the information network protocol (step S7). More specifically, in allocating a communication type to the time slot, the time slot setter 13 allocates the control network protocol to a time slot in priority to allocation of the information network protocol. When receiving the communication type and the communication attribute illustrated in FIG. 5 from the devices 20, for example, the time slot setter 13 allocates the communication types with the communication attribute CTRL to the time slot TS1 and subsequent time slots and then allocates the communication types with the communication attribute INFO to the last time slot TS0.

The time slot setter 13 then records the time slot allocated in step S7 into the device information table 121 (step S8). The time slots are thus associated with the types of communication performed by the devices 20 as illustrated in FIG. 5.

The time slot setter 13 then calculates the initial values of the communication cycle and the time slot length. More specifically, the time slot setter 13 reads the communication cycle tolerance corresponding to the control network protocol recorded in the device information table 121. When the tolerances indicate the upper limits of the tolerance range as illustrated in FIG. 5, the time slot setter 13 sets the smallest tolerance among the read tolerances as the initial value of the communication cycle.

The time slot setter 13 also acquires a predetermined length of the time slot corresponding to the control network protocol recorded in the device information table 121. This time slot length may be determined by the control apparatus 10 with a predetermined procedure and stored into a memory, or specified by the user. The time slot setter 13 acquires the initial value of the length of the time slot TS0 corresponding to the information network protocol by subtracting the sum of the lengths of the time slots, each corresponding to the control network protocol, from the initial value of the communication cycle. More specifically, the time slot setter 13 calculates the initial value of TSL0 with a calculation expressed with Formula 1 below, where the lengths of the time slots TS1, TS2, . . . , and TS0 are denoted as TSL1, TSL2, . . . , and TSL0, n is an integer greater than or equal to 1, and the initial value of the communication cycle is PR0.

$$TSL0=PR0-\Sigma(TSLn) \quad (1)$$

The time slot setter 13 then determines whether an initial value is acquired with the calculation (step S10). In other words, the time slot setter 13 determines whether an initial value can be set. For example, when the initial value of the communication cycle is small and many types of control network protocol are included, the initial value of the time slot TS0 is not calculated, and the result of determination in step S10 is negative.

When the result of determination in step S10 is negative (No in step S10), the control apparatus 10 notifies the user of an error (step S11) and ends the initialization. When the result of determination in step S10 is positive (Yes in step S10), the control apparatus 10 ends the initialization.

Figure 11:
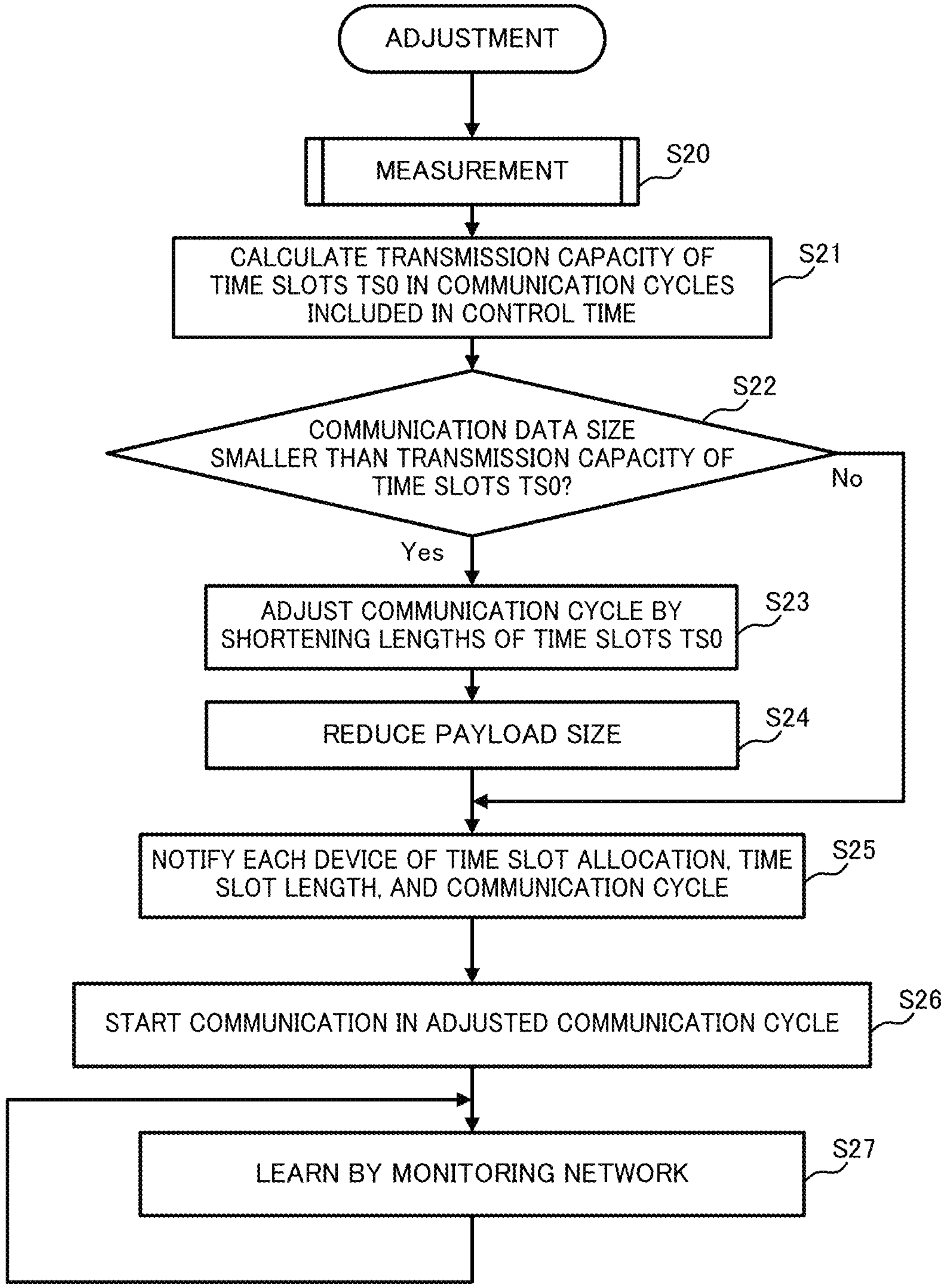
FIG. 11 is a flowchart of adjustment in the embodiment.
Figure 12:
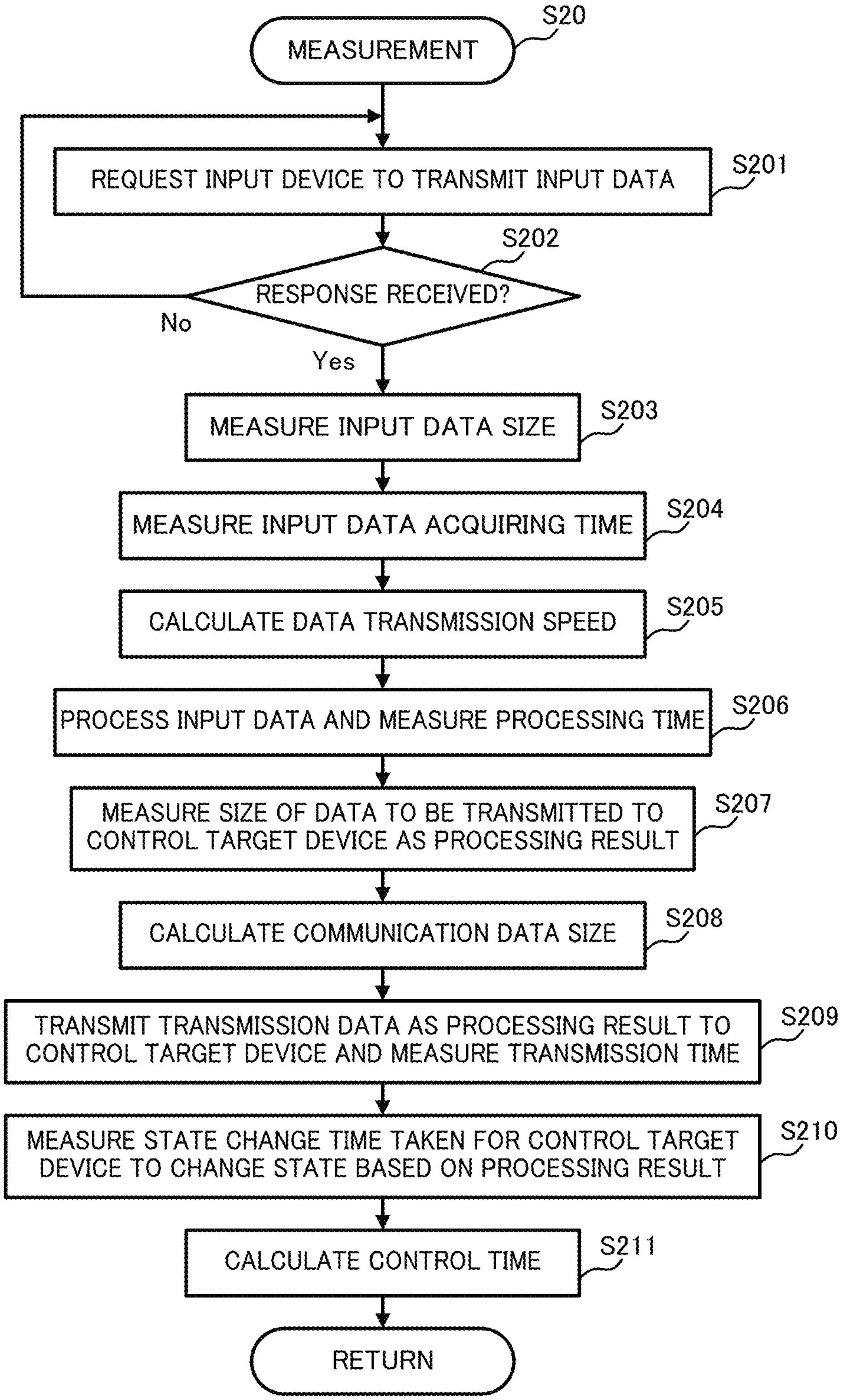
FIG. 12 is a flowchart of measurement in the embodiment.

After the initialization, the control apparatus 10 starts the communication cycle adjustment in FIG. 11. In the adjustment, the measurer 14 measures the control time and the communication data size (step S21). In this measurement, as illustrated in FIG. 12, the measurer 14 requests the input device to transmit input data under the information network protocol (step S201).

When receiving no response to this request (No in step S202), the measurer 14 repeats the processing in step S201. When receiving a response to this request (Yes in step S202), the measurer 14 measures the size of the input data transmitted from the input device (step S203) and measures the time taken for acquiring the input data (step S204).

The measurer 14 then calculates the data transmission speed based on the input data size measured in step S203 and the input data acquiring time measured in step S204 (step S205). More specifically, the size of data transmitted per unit time is calculated by dividing the input data size by the acquiring time. A minimum value for transmission from the multiple devices 20 in a best-effort manner may be calculated as the transmission speed.

Subsequently, the device controller 15 processes the input data, and the measurer 14 measures the processing time taken for processing the input data (step S206). Transmission data to be transmitted to the control target device is then generated as a result of processing the input data, and the measurer 14 calculates a communication data size as the sum of the input data size and the transmission data size (step S208).

The communicator 11 then transmits the transmission data as the processing result to the control target device, and the measurer 14 measures the transmission time (step S209). More specifically, the measurer 14 may acquire the measurement value of the transmission time by multiplying the transmission data size by the transmission speed acquired in step S205. The measurer 14 may measure the transmission time based on the notification from the control target device as illustrated in FIG. 9.

The measurer 14 then measures a state change time taken for the control target device to change the state based on the processing result (step S210). More specifically, the measurer 14 may acquire the measurement result by causing the control target device to measure the time taken for ending the actual operation based on the transmission data or may use the processing time collected from the device 20 as the control target device in the initialization as the state change time.

The measurer 14 then calculates the control time as the sum of the acquiring time acquired in step S204, the processing time acquired in step S206, the transmission time acquired in step S209, and the state change time acquired in step S210 (step S211). The measurement then ends. The measurer 14 corresponds to an example of measurement means for measuring the control time based on information provided from the input device and the control target device.

Figure 13:
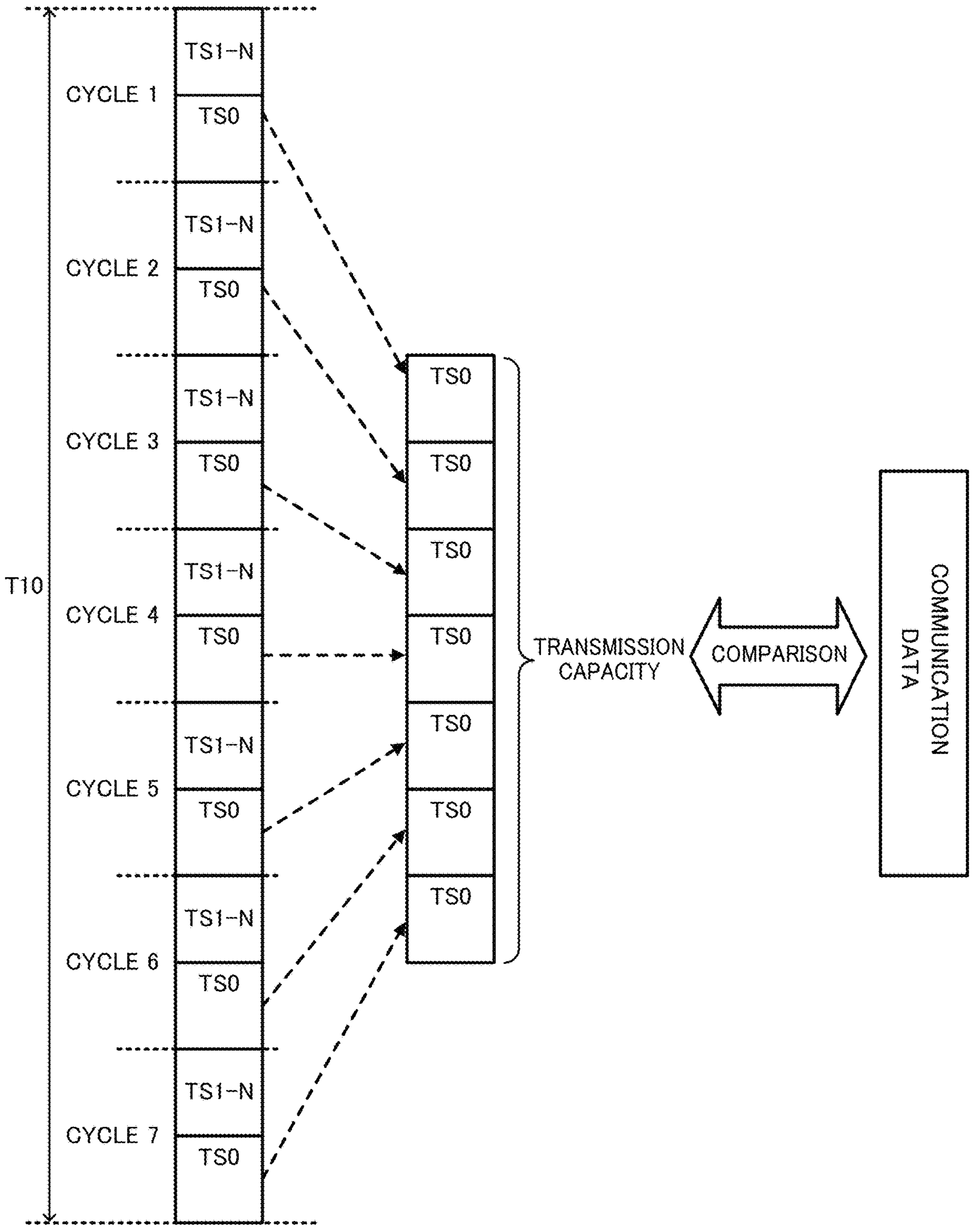
FIG. 13 is a diagram describing comparison between the transmission capacity of time slots and the communication data size in the embodiment.

Referring back to FIG. 11, after the measurement, the measurer 14 calculates the transmission capacity of the time slots TS0 in the communication cycles included in the control time (step S21). More specifically, as illustrated in FIG. 13, the measurer 14 calculates the capacity of data transmittable in all the time slots TS0 in cycles 1 to 7 being the communication cycles included in the control time T10.

Subsequently, the time slot setter 13 determines whether the communication data size calculated in the measurement in step S208 is smaller than the transmission capacity of the time slots TS0 calculated in step S21 (step S22). More specifically, as illustrated on the right in FIG. 13, the time slot setter 13 compares the transmission capacity of the time slots TS0 with the communication data size.

When a determination is made that the communication data size is not smaller than the transmission capacity (No in step S22), the processing by the control apparatus 10 advances to step S25. When determining that the communication data size is smaller than the transmission capacity (Yes in step S22), the time slot setter 13 determines that the current setting value indicating the lengths of the time slots TS0 is too large and adjusts the communication cycle by shortening the lengths of the time slots TS0 (step S23).

Figure 14:
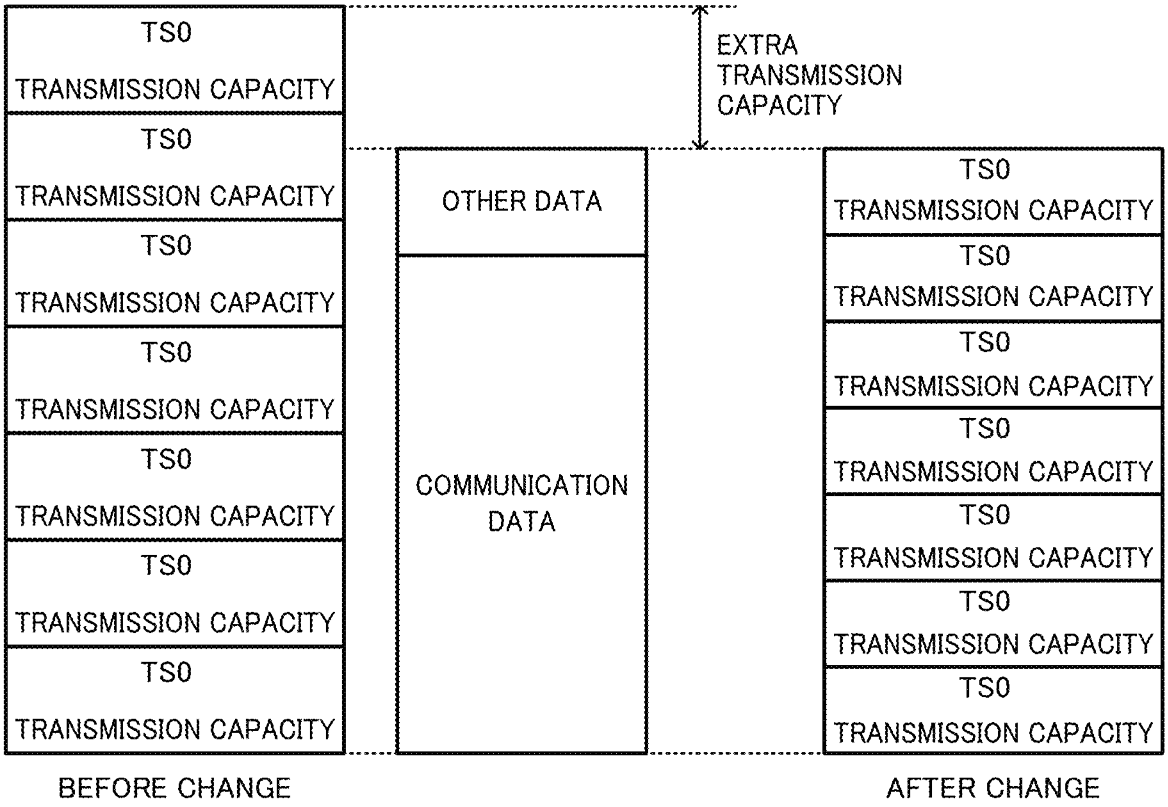
FIG. 14 is a diagram describing shortening of the lengths of the time slots in the embodiment.
Figure 15:
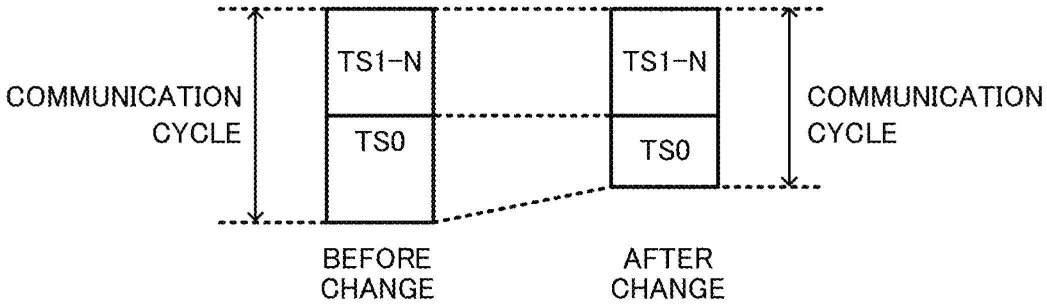
FIG. 15 is a diagram illustrating changing of a communication cycle in the embodiment.

More specifically, as illustrated in FIG. 14, the time slot setter 13 determines a portion of the total transmission capacity exceeding the communication data size and the size of other data transmitted for uses other than controlling the control target device to be an extra transmission capacity and shortens the lengths of the time slots TS0 to equalize the total transmission capacity to the sum of the communication data size and the size of other data. Thus, as illustrated in FIG. 15, the communication cycle is changed and shortened to improve the real-time performance. The size of other data may be predetermined by the user or set as a margin based on the communication data size. For example, other data may have a size corresponding to 20% of the communication data size. The time slot setter 13 corresponds to an example of adjustment means for adjusting, when the size of communication data transmitted or received to control the control target device in the first type of communication is smaller than the transmission capacity of data in the time segment that is included in the plurality of time segments included in the communication cycle included in the control time and that corresponds to the first type, the length of the communication cycle by shortening the length of the time segment corresponding to the first type from the current setting value.

Figure 16:
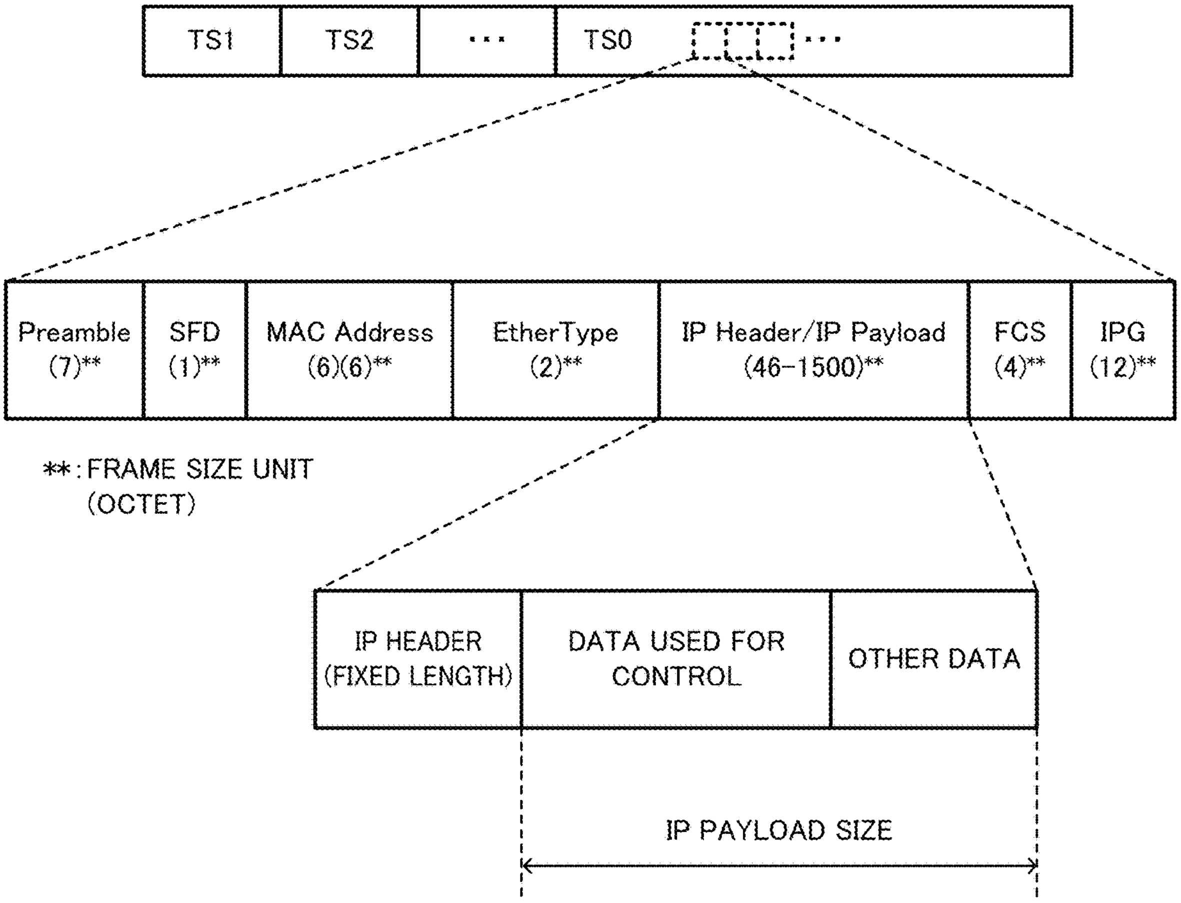
FIG. 16 is a diagram describing a payload size in the embodiment.

The time slot setter 13 reduces, based on the shortening of the time slot lengths, the size of a payload in data to be transmitted in each time slot TS0 from the current setting value (step S24). For example, FIG. 16 illustrates the size of an IP payload in an IP packet. The time slot setter 13 reduces the size of the payload in the time slot TS0 having the changed length within a range in which the communication data and other data are reliably stored in the payload and transmitted. The length of an IP header illustrated in FIG. 16 is dependent on the transport layer protocol. The time slot setter 13 thus changes the IP payload size based on the transport layer protocol recorded in the device information table 121.

Referring back to FIG. 11, the control apparatus 10 notifies each device 20 of the time slot allocation, each time slot length, and the communication cycle (step S25). This allows the preparations for communication on the network 30 in the adjusted communication cycle.

The control apparatus 10, as well as the devices 20, starts communication in the adjusted communication cycle (step S26). More specifically, the communicator 11 performs, in each time slot, the type of communication allocated to the time slot by the time slot setter 13 as the allocation means. To transmit communication data in a prioritized manner, the control apparatus 10 transmits other data to be transmitted in the time slots TS0 in a best-effort manner at a time at which no communication data is transmitted.

Subsequently, the network monitor 16 monitors the network 30 and repeatedly learns the operating state of the network 30 (step S27). More specifically, the network monitor 16 learns the correlation between the transmission volume of data including the communication data and other data in the time slots TS0 and the operating state of the network 30 at the time of data transmission. The operating state of the network 30 includes a parameter for determining at least one of the communication data size or the control time, and includes, for example, the structure of the control system 100, and operation conditions for data generation and transmission frequency during the operation of the control system 100. With the network monitor 16 learning repeatedly, the relationship between the data size and the time slot lengths in the operating state of the control system 100 is patterned, and information indicating the correlation is accumulated in a database. Thus, at the subsequent activation of the control apparatus 10, the control apparatus 10 can set an appropriate time slot lengths by simply identifying the connected devices 20 without measurement performed by the measurer 14.

The network monitor 16 may learn the volume of data transmitted in the time slots TS0 other than the communication data during the normal operation of the control system 100, and use, at the subsequent activation of the control apparatus 10, the learning result as the size of other data illustrated in FIG. 14.

The network monitor 16 may record the structure of the control system 100, the input data size and the acquiring time acquired from each device 20, and the control time, and estimate, upon determining the connection of the devices 20, the lengths of the time slots TS0 based on these recorded pieces of information at every subsequent activation of the control apparatus 10. The network monitor 16 repeatedly compares such an estimation result and the lengths of the time slots TS0 set by the above processing at the activation to minimize an estimation error and improve the estimation accuracy. When the estimation accuracy is fully improved, the time slot setter 13 may set the lengths of the time slots TS0 based on the estimation without measuring the control time. This allows the control system 100 to reduce the time taken before starting the normal operation. The time slot setter 13 may adjust the time slot lengths by automatically selecting a protocol at the upper layer of IP communication such as TCP or UDP based on reliability of data. The time slot setter 13 may adjust the time slot lengths by automatically selecting a protocol at the upper layer of IP communication such as TCP or UDP based on reliability of data. The time slot setter 13 corresponds to an example of adjustment means for setting, based on the result of learning performed by the network monitor 16 as the learning means, the length of the time segment corresponding to the first type to a new setting value.

As described above, in the control apparatus 10 according to the present embodiment, the time slot setter 13 shortens the lengths of the time slots TS0 to adjust the length of the communication cycle when the communication data size is smaller than the transmission capacity of data in the time slots TS0. This shortens the communication cycle together with the time slots TS0. The real-time performance can thus be improved in communication on the network including the time slots corresponding to the communication types under the TSN standards.

In some embodiments, the control apparatus 10 may adjust the lengths of the time slots TS1, TS2, and subsequent time slots corresponding to the control network protocol in the above manner. For the time slots TS0 in particular, however, the initial value is typically used independently of the actual communication volume when the time slots TS0 may have extra lengths. The control apparatus 10 according to the present embodiment can effectively improve the real-time performance by reducing the lengths of the time slots TS0.

The time slot setter 13 changes the payload length of data transmitted in the time slot TS0. This avoids transmission of data with an extra long payload.

The device information manager 12 acquires information indicating the type of communication to be performed from the control target device, and the time slot setter 13 allocates the control network protocol to a time slot in priority to allocation of the information network protocol. This allows a high-priority protocol involving punctuality to be more reliably allocated to the time slots.

The control time includes the time taken for acquiring input data, the processing time taken for processing the input data, the time taken for transmitting transmission data as the processing result, and the state change time taken for the control target device to change the state based on the transmission data. The time taken for a series of control from the transmission of the input data to the completion of the state change of the control target device is thus acquired, allowing the calculation of the minimum transmission capacity for transmitting the communication data. In the above embodiment, the control time taken for one control operation is measured, but the average control time for one control operation or the control time for multiple control operations may be measured.

Although one or more embodiments of the present disclosure have been described above, the present disclosure is not limited to the above embodiments.

For example, the structure of the control system 100 is not limited to the example illustrated in FIG. 1 and may be changed as appropriate. The control system 100 may include fewer than or more than three devices 20. In the example, the time slot setter 13 performs the time slot allocation and the communication cycle adjustment, but a functional component for allocating time slots and a functional component for adjusting a communication cycle may be separate.

In the example, the control time includes four phases as illustrated in FIG. 6, but the control time may have any number of phases. When the control apparatus 10 serves as the control start point, the control time may be measured without the input data acquiring time. In the example, a single input device transmits the input data, and a single control target device receives the transmission data, but the structure is not limited to this. When multiple transmitters transmit input data, the time taken for acquiring all the multiple pieces of input data may be measured as the acquiring time. When the transmission data is transmitted to multiple devices, the time taken for transmitting all the multiple pieces of transmission data and the time taken for changing the states of the control target devices may be measured as the transmission time and the state change time. In the example, the input device and the control target device are different devices, but the input device and the control target device may be the same device.

The functions of the control apparatus 10 may be implemented by dedicated hardware or a general-purpose computer system.

For example, the program 49 executable by the processor 41 may be stored in a non-transitory computer-readable recording medium for distribution. The program 49 is installed in a computer to provide a device that performs the above processing. Examples of such a non-transitory recording medium include a flexible disk, a compact disc ROM (CD-ROM), a digital versatile disc (DVD), and a magneto-optical (MO) disk.

The program 49 may be stored in a disk device included in a server on a communication network, such as the Internet, and may be, for example, superimposed on a carrier wave to be downloaded to a computer.

The above processing may also be performed by the program 49 activated and executed while being transferred through a communication network.

The above processing may be performed by entirely or partially executing the program 49 on a server while a computer is transmitting and receiving information about the processing through a communication network.

In the system with the above functions implementable partially by the operating system (OS) or through cooperation between the OS and applications, portions implementable by applications other than the OS may be stored in a non-transitory recording medium that may be distributed or may be downloaded to a computer.

Means for implementing the functions of the control apparatus 10 is not limited to software. The functions may be partially or entirely implemented by dedicated hardware including circuits.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

INDUSTRIAL APPLICABILITY

The present disclosure is usable for a system including devices that communicate with one another in each time segment defined by the time shared between the devices.

REFERENCE SIGNS LIST

100 Control system
10 Control apparatus
11 Communicator
12 Device information manager
121 Device information table
13 Time slot setter
14 Measurer
15 Device controller
16 Network monitor
20 to 23, 239 Device
231 Network unit
232 CPU
233 I/O unit
234 System bus
30 Network
41 Processor
42 Main storage
43 Auxiliary storage
44 Clock
45 Input unit
46 Output unit
47 Communicator
48 Internal bus
49 Program
51, 52 Communication cycle

The invention claimed is:

1. A control apparatus for controlling a control target device through a network, the control apparatus comprising:

a communicator to perform, in a communication cycle defined by a shared time shared with the control target device, in each of a plurality of time segments included in the communication cycle, a type of communication that corresponds to the time segment; and processing circuitry to measure a control time taken for controlling the control target device when a first type of communication is performed independently of the plurality of time segments, and adjust, when a size of communication data transmitted or received to control the control target device in the first type of communication is smaller than a transmission capacity of data in a time segment that is included in the plurality of time segments included in the communication cycle included in the control time and that corresponds to the first type, a length of the communication cycle by shortening a length of the time segment corresponding to the first type from a current setting value.

2. The control apparatus according to claim 1, wherein the first type of communication is communication under a protocol that does not guarantee transmission of information within a predetermined time length.

3. The control apparatus according to claim 2, wherein the processing circuitry sets, when shortening the length of the time segment corresponding to the first type, a length of a payload included in data to be transmitted in the first type of communication to a value less than a current setting value.

4. The control apparatus according to claim 3, wherein the plurality of time segments include the time segment corresponding to the first type, and a time segment corresponding to a second type that is a type of communication under a protocol that guarantees transmission of information within a predetermined time length.

5. The control apparatus according to claim 2, wherein the plurality of time segments include the time segment corresponding to the first type, and a time segment corresponding to a second type that is a type of communication under a protocol that guarantees transmission of information within a predetermined time length.

6. The control apparatus according to claim 5, wherein the processing circuitry acquires, from the control target device, type information indicating types of communication to be performed, and allocates a type of the types of communication indicated by the type information to the plurality of time segments included in the communication cycle, wherein the processing circuitry allocates the second type to a time segment of the plurality of time segments in priority to allocation of the first type, and the communicator performs, in each of the plurality of time segments, the type of communication allocated to the time segment by the processing circuitry.

7. The control apparatus according to claim 2, wherein the processing circuitry processes data to control the control target device, and the control time includes a time taken for the processing circuitry to process data.

8. The control apparatus according to claim 1, wherein the processing circuitry processes data to control the control target device, and the control time includes a time taken for the processing circuitry to process data.

9. The control apparatus according to claim 8, wherein the control time includes a time taken for acquiring input data from an input device that is the control target device or that is different from the control target device, the time taken for the processing circuitry to process the input data, a time taken for transmitting, to the control target device, a processing result that is a result of processing by the processing circuitry, and a time taken for the control target device to change a state based on the processing result, and the processing circuitry measures the control time based on information provided from the input device and the control target device.

10. The control apparatus according to claim 1, wherein the processing circuitry learns a state of communication on the network in the adjusted communication cycle, and sets, based on a result of learning, the length of the time segment corresponding to the first type to a new setting value.

11. A communication cycle adjustment method implementable by a control apparatus for controlling a control target device, the communication cycle adjustment method comprising:

performing, by a communicator, in a communication cycle defined by a shared time shared with the control target device, in each of a plurality of time segments included in the communication cycle, a type of communication that corresponds to the time segment;

measuring, by a measurer, a control time taken for controlling the control target device when a first type of communication is performed independently of the plurality of time segments; and adjusting, by an adjuster, when a size of communication data transmitted or received to control the control target device in the first type of communication is smaller than a transmission capacity of data in a time segment that is included in the plurality of time segments included in the communication cycle included in the control time and that corresponds to the first type, a length of the communication cycle by shortening a length of the time segment corresponding to the first type from a current setting value.

12. A non-transitory computer-readable recording medium storing a program for causing a control apparatus for controlling a control target device to execute processing, the processing comprising:

performing, in a communication cycle defined by a shared time shared with the control target device, in each of a plurality of time segments included in the communication cycle, a type of communication that corresponds to the time segment;

measuring a control time taken for controlling the control target device when a first type of communication is performed independently of the plurality of time segments; and adjusting, when a size of communication data transmitted or received to control the control target device in the first type of communication is smaller than a transmission capacity of data in a time segment that is included in the plurality of time segments included in the communication cycle included in the control time and that corresponds to the first type, a length of the communication cycle by shortening a length of the time segment corresponding to the first type from a current setting value.

* * * * *